United States Patent [19]
Urai et al.

[11] Patent Number: 5,761,014
[45] Date of Patent: Jun. 2, 1998

[54] THIN FILM MAGNETIC HEAD WITH MAGNETICALLY INSULATING LAYER FOR SUPPRESSING UNDERSHOOTS

[75] Inventors: Haruo Urai; Sinsaku Saitho, both of Tokyo, Japan

[73] Assignee: NEC Corporation, Japan

[21] Appl. No.: 671,607

[22] Filed: Jun. 28, 1996

[30] Foreign Application Priority Data

Jun. 30, 1995 [JP] Japan ................... 7-166027

[51] Int. Cl.⁶ ............................................. G11B 5/147
[52] U.S. Cl. ................................................. 360/126
[58] Field of Search ............................ 360/120, 122, 360/126

[56] References Cited

U.S. PATENT DOCUMENTS

| | | | |
|---|---|---|---|
| 5,162,960 | 11/1992 | Sakata | 360/120 |
| 5,406,434 | 4/1995 | Amin | 360/126 |
| 5,452,166 | 9/1995 | Aylwin | 360/126 |
| 5,479,310 | 12/1995 | Atsushi | 360/126 |

OTHER PUBLICATIONS

Yoshida et al; "Edge Eliminated Head"; Nov. 1993; pp. 3837–3839; IEEE Transactions on Magnetics, vol. 29, No. 6.

*Primary Examiner*—A. J. Heinz
*Attorney, Agent, or Firm*—Hayes, Soloway, Hennessey, Grossman & Hage, P.C.

[57] ABSTRACT

A thin film magnetic head has first and second magnetic pole layers and, a thin film coil, a magnetic gap layer, and a magnetically insulating layer. The magnetically insulating layer is disposed along a plane facing a recording medium, and divides at least one of the front end section of the first magnetic pole layer and the frond end section of the second magnetic pole layer into a plurality of sub-sections. An additional magnetic pole layer may be provided on at least one of the front end section of the first magnetic pole layer and the front end section of the second magnetic pole layer with a magnetically insulating layer being interposed therebetween. The thin film magnetic head thus fabricated enables the reduction of undershoots to appear at both sides of a main peak of the waveform a signal reproduced by the magnetic head.

4 Claims, 9 Drawing Sheets

THIN FILM MAGNETIC HEAD WITH MAGNETICALLY INSULATING LAYER FOR SUPPRESSING UNDERSHOOTS

BACKGROUND OF THE INVENTION (1) Field of the Invention

This invention relates to a thin film magnetic head to be used in a magnetic recording device, and more particularly to a thin film magnetic head with an improved reliability achieved by reducing to a lower level the magnitude of "undershoot" that appears on both sides of a main peak of the waveform of the reproduced data signal.

(2) Description of the Related Art

A magnetic recording device comprises as essential components thereof a magnetic recording medium for storing data that is mainly made of a hard magnetic thin film and a magnetic head for recording data into and reproducing them from the magnetic recording medium. Because of the recent technological development for high density data storage, the thin film magnetic head has been remarkably improved in terms of not only data recording density but also the data recording frequency. Currently, thin film magnetic heads having a low inductance and a high signal reproducing efficiency are generally used to realize a high data recording density. A thin film magnetic head comprises a pair of magnetic poles with a gap disposed therebetween, which magnetic poles are made of respective thin films having a thickness of several micrometers.

A first known thin film magnetic head is shown in FIGS. 1A and 1B of the accompanying drawings, of which FIG. 1A illustrates a schematic sectional view of the head, and FIG. 1B illustrates an output waveform of a reproduced signal.

As shown, in this known thin film magnetic head comprises first and second magnetic pole layers 100 and 102 that are connected to each other at the respective base sections 100d and 102d and are made of thin film soft magnetic materials, a thin film coil 103 wound at least around either the first magnetic pole layer 100 or the second magnetic pole layer 102 and a magnetic gap layer 104 disposed between the front end sections 100a and 102a of the first and second magnetic pole layers 100 and 102.

As shown, an isolated transition of magnetization 112 is formed to separate opposite magnetizing directions 108 and 110 of a recording medium 106 disposed under the magnetic head. When the recording medium moves along arrow 113, the data signal reproduced by the thin film magnetic head shows a waveform having an isolated main peak 114 representing the reproduced data signal and two undershoots 116 located respectively on lateral sides of the main peak 114 and produced respectively corresponding to a lateral section 100b of the first magnetic pole layer 100 and a lateral section 102b of the second magnetic pole layer 102.

The undershoot output 116 located on the respective lateral sides of the isolated main peak 114 have a polarity opposite to that of the isolated main peak 114 and interferes with the isolated main peak 114 to change the value of the isolated main peak 114 as the recording linear density of the recording medium increases and the distance separated by the isolated transition of magnetization 112 is reduced. Additionally, the isolated main peak 114 can eventually be caused to be shifted.

The undershoot outputs 116 appear when the isolated transition of magnetization 112 of the recording medium 106 passes by the lateral section 100b and goes under the first magnetic pole layer 100 and when it passes by the lateral section 102b and leaves the second magnetic pole layer 102, and this is because the rate at which the magnetic flux generated by the isolated transition of magnetization 112 flows into the first magnetic pole layer 100 and the second magnetic pole layer 102 changes abruptly at those respective points.

A second known thin film magnetic head is proposed in IEEE Transactions on Magnetics, Vol. 29, No. 6., pp. 3837-3839 (November 1993) to reduce the undershoots 116 having the polarity opposite to that of the isolated main peak 114. FIGS. 2A and 2B of the accompanying drawings illustrate the proposed magnetic head. FIG. 2A shows an enlarged schematic partial sectional view of the head and FIG. 2B shows the output waveform of a reproduced signal. Here, the components that are same or similar to their counterparts of the magnetic head of FIGS. 1A and 1B are denoted respectively by the same reference symbols.

The second known thin film magnetic head is provided on the front end sections 100a and 102a of the first and second magnetic pole layers 100 and 102 with recesses 100c and 102c. These recesses 100c and 102c are formed by partly removing the respective front end sections 100a and 102a by means of an appropriate technique such as ion etching or ion milling. As a result, the undershoots 118 have an amplitude slightly smaller than that of the undershoots of the first known magnetic head.

However, the above described second known thin film magnetic head is accompanied by the following problems.

(1) While the undershoot outputs 118 have a low profile, they are still there. As described above, the undershoots result in shifting of the isolated main peak and hence raising the detection error rate in the peak detecting operation conducted when the magnetic recording device is operating for data reproduction.

(2) As the front end sections 100a and 102a are partly removed, they are made partly very thin on the respective sides of the magnetic gap 104. Then, a magnetically saturated state appears in the front end sections 100a and 102a when an electric current flows therethrough for data recording operation so that the transition of magnetization 112 is broadened resulting in the reduction of the output level for high density data recording.

(3) Because of the recessed profile of the front end sections 100c and 102c, dust and other contaminants can easily be caught there to consequently reduce the reliability of the magnetic recording device comprising such a thin film magnetic head.

(4) In order to form recesses in the front end sections 100a and 102a, their forming process must be carried out from the side that is to be magnetically floated. More specifically, after slicing a wafer into rows to be worked with a slider for preparing thin film magnetic heads, each of the rows is exposed to light and subjected to an intricate processing operation typically involving ion milling to produce recesses 100c and 102c. Thus, wafers cannot be treated on a mass production basis and the productivity of preparing such recesses is inevitably low.

SUMMARY OF THE INVENTION

A object of the present invention, therefore, is to overcome the problems existing in the prior art, and to provide a thin film magnetic head and a fabrication process therefor, which enables the reduction of the magnitude of undershoots appearing on the lateral sides of the main peak of the waveform of the reproduced data signal to a low level and the avoidance of a magnetically saturated state that can appear in the front end sections of the magnetic head. Such a magnetic head may have a profile less prone to the adhesion of dust and other contaminants and can be manufactured on a mass production basis.

According to one aspect of the invention, there is provided a thin film magnetic head comprising:

first and second magnetic pole layers which are made of a thin film of a soft magnetic material and connected to each other at respective base sections thereof;

a thin film coil which in wound around at least one of the first magnetic pole layer and the second magnetic pole layer;

a magnetic gap layer which is disposed between a front end section of the first magnetic pole layer and a front and section of the second magnetic pole layer; and at least one magnetically insulating layer which is disposed along a plane facing a recording medium, the magnetically insulating layer partitioning at least one of the front end section of the first magnetic pole layer and the frond end section of the second magnetic pole layer.

According to another aspect of the invention, there is provided a method of fabricating a thin film magnetic head in which a first magnetic pole layer and a second magnetic pole layer are respectively connected to base sections, a thin film coil is wound at least around one of the first magnetic pole layer and the second magnetic pole layer, and a magnetic gap layer is provided between a front end section of the first magnetic pole layer and a front end section of the second magnetic pole layer, the method comprising:

a first step of forming the first magnetic pole layer of thin film of a soft magnetic material on a non-magnetic substrate;

a second step of forming the magnetic gap layer and the thin film coil on the first magnetic pole layer;

a third step of forming the second magnetic pole layer of thin film of soft magnetic material; and a fourth step of forming, after the third step, an additional magnetic pole layer of thin film of a soft magnetic material over the front end section of the second magnetic pole layer with a magnetically insulating layer interposed therebetween.

The fourth step may instead be a step of forming, between the first step and the second step, an additional magnetic pole layer of thin film of a soft magnetic material over the front end section of the first magnetic pole layer with a magnetically insulating layer interposed therebetween.

In another form, the fourth step may be a step of forming, between the second step and the third step, an additional magnetic pole layer of thin film of a soft magnetic material over the front end section of the second magnetic pole layer with a magnetically insulating layer interposed therebetween.

In still another form, the fourth step may be a step of forming, before the first step, an additional magnetic pole layer of thin film of a soft magnetic material under the front end section of the first magnetic pole layer with a magnetically insulating layer interposed therebetween.

In a thin film magnetic head according to the first aspect of the invention, the front end of at least either the first or second magnetic pole layer is divided into a plurality of sub-sections exposed to the plane facing the recording medium by one or more than one magnetically insulating layers. Thus, as a result of providing a plurality of sub-sections in the front end section of at least either of the magnetic pole layer, the undershoots in the waveform of the signal reproduced by the magnetic head attributable to the isolated transition of magnetization of the recording medium can be spread over a long period of time to consequently reduce the amplitude. Additionally, since the front end sections of the magnetic pole layers do not have to be made particularly thin, the generation of a magnetically saturated state in the magnetic pole layers can be effectively avoided. Still additionally, since the terminals of the front end section of the magnetic pole layers are made flat by providing magnetically insulating layers, dust and other contaminants are effectively prevented from adhering thereto to improve the reliability of the magnetic head.

With a method of fabricating a thin film magnetic head according to the invention, there is provided a step of preparing an additional magnetic pole layer of a thin film of a soft magnetic material on the front end section of the second magnetic pole layer with a magnetically insulating layer disposed therebetween, and this step is carried out after the completion of a known manufacturing process. Since both the magnetically insulating layer and the additional magnetic pole layer can be provided during the process of manufacturing wafers, it can be effectively used for mass production.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1A:
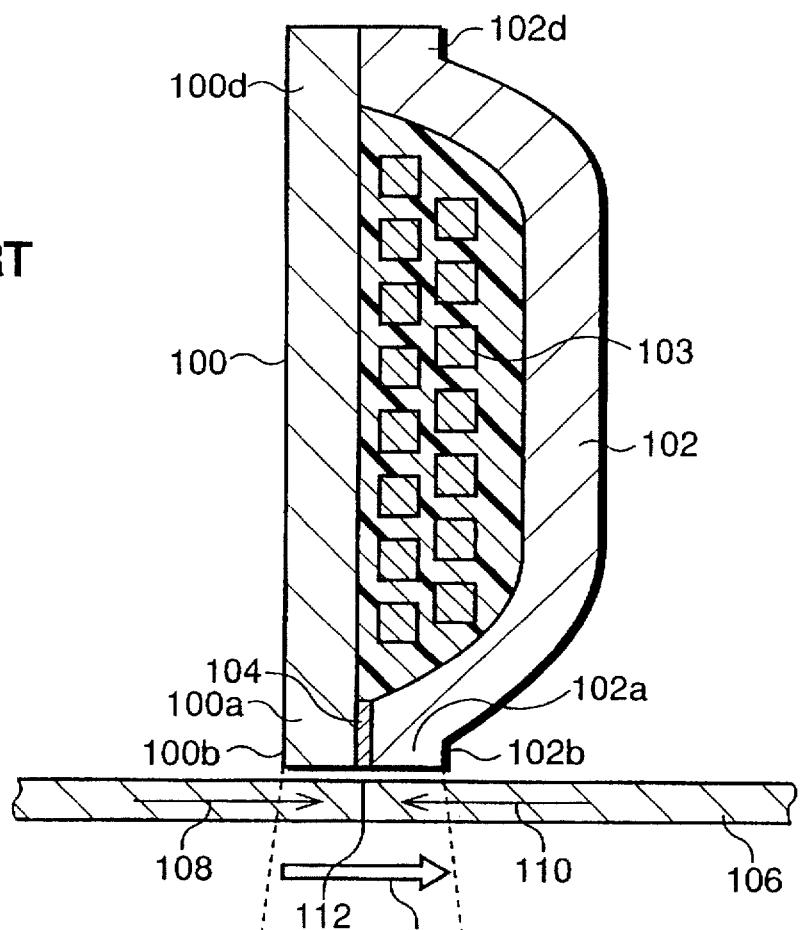
FIG. 1A is a schematic cross sectional view of a first known thin film magnetic head.
Figure 1B:
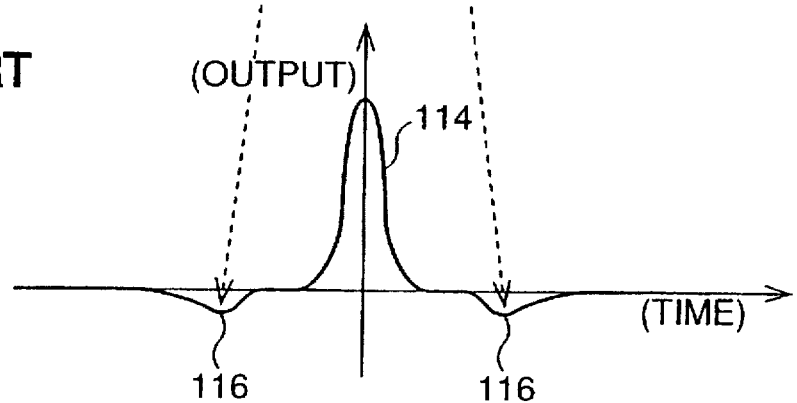
FIG. 1B is a graph showing the output waveform of a signal reproduced by the known thin film magnetic head of FIG. 1A.
Figure 2A:
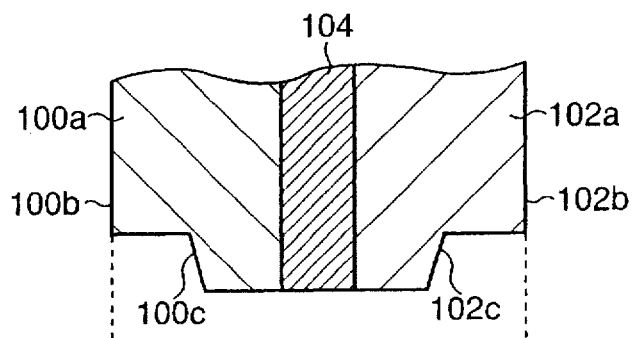
FIG. 2A is an enlarged schematic partial sectional view of a second known thin film magnetic head.
Figure 2B:
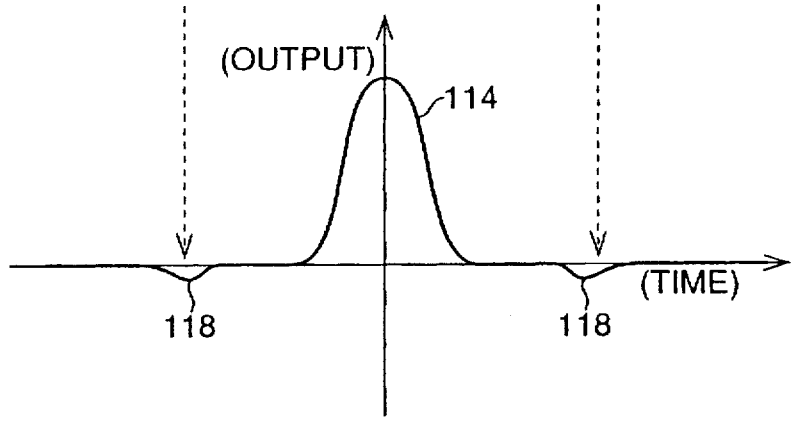
FIG. 2B is a graph showing the output waveform of a signal reproduced by the known thin film magnetic head of FIG. 2A.
Figure 3:
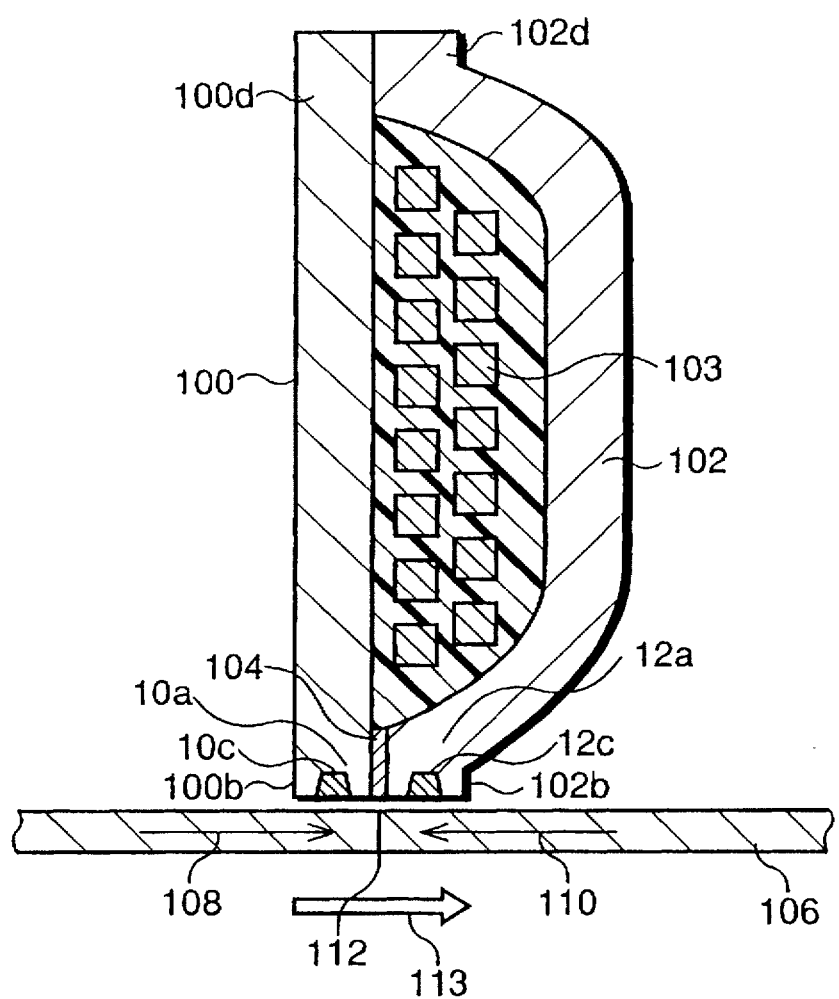
FIG. 3 is a schematic sectional view of a first embodiment of a thin film magnetic head according to the invention.
Figure 4A:
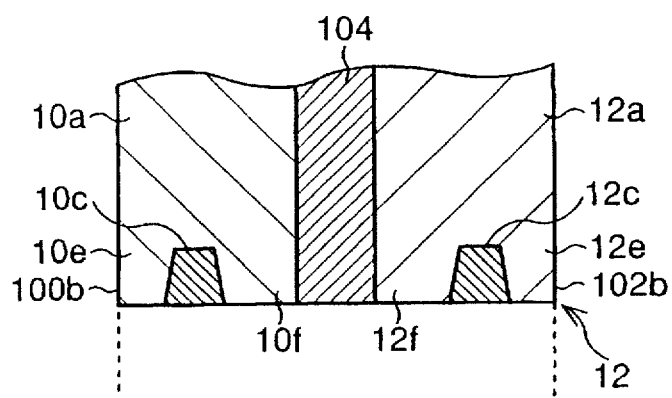
FIG. 4A is an enlarged schematic partial sectional view of the first embodiment of FIG. 3.
Figure 4B:
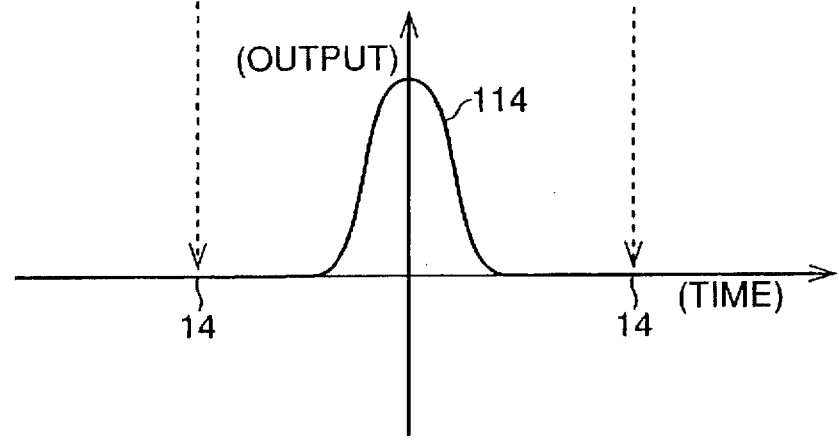
FIG. 4B is a graph showing the output waveform of a signal reproduced by the embodiment of FIG. 3.

Firstly, a first embodiment of a thin film magnetic head according to the invention will be described by referring to FIGS. 3, 4A and 4B, of which FIG. 3 is a schematic sectional view, FIG. 4A is an enlarged partial sectional view and FIG. 4B to a graph showing the output waveform of a signal reproduced by the first embodiment. Here, the components that are same or similar to their counterparts of the thin film magnetic head of FIGS. 1A and 1B are denoted respectively by the same reference symbols and will not be described here any further.

The thin film magnetic head of this embodiment comprises a first magnetic pole layer 100 and a second magnetic pole layer 102 that are made of an alloy of nickel and iron and connected to each other at respective base sections 100$d$ and 102$d$, a thin film coil 103 wound around the second magnetic pole layer 102 and a magnetic gap layer 104 disposed between the front end sections 10$a$ and 12$a$ of the first and second magnetic pole layers 100 and 102 and made of aluminum oxide. Each of the front end sections 10$a$ and 12$a$ is divided into two sub-sections by a magnetically insulating layer 10$c$ or 12$c$, and disposed along the plane 12 (FIG. 4A) facing the recording medium. Thus, the front end section 10$a$ has two tips ie and 10$f$ and the front end section 12$a$ also has two tips 12$e$ and 12$f$ (FIG. 4A). The magnetically insulating layer 10$c$ and 12$c$ can be produced by any of the known thin film forming techniques including sputtering, photolithography and dry etching. Therefore, both the first and second magnetic pole layers 100 and 102 have a multilayer structure.

As shown in FIG. 4A, the thin film magnetic head of this embodiment has as many as four front end sub-sections 10$e$, 10$f$, 12$e$ and 12$f$. As a result the waveform of the signal reproduced by the isolated transition of magnetization 112 has undershoot outputs 14 that are spread out to become flat and make their amplitude almost unrecognizable and negligible. Additionally, since the front end sections 10$a$, 12$a$ are not made thin unlike those of the above described second known thin film magnetic head, they are not apt to become magnetically saturated and less prone to the adhesion of dust and other contaminants.

FIGS. 5A to 5D illustrate a second embodiment of a thin film magnetic head according to the invention for use in explaining sequential steps. A method of fabricating a thin film magnetic head according to the invention will be described hereinafter by way of this second embodiment shown in FIGS. 5A to 5D.

Figure 5A:
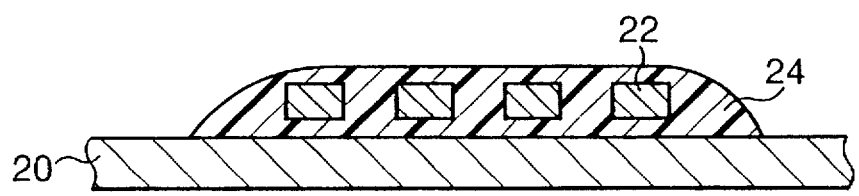
FIGS. 5A to 5D are schematic sectional views of a second embodiment of a thin film magnetic head according to the invention for use in explaining sequential steps.
Figure 5B:
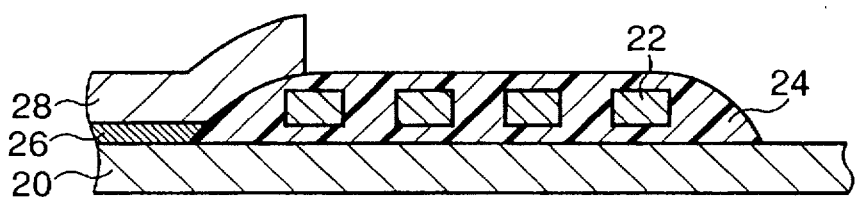
Figure 5C:
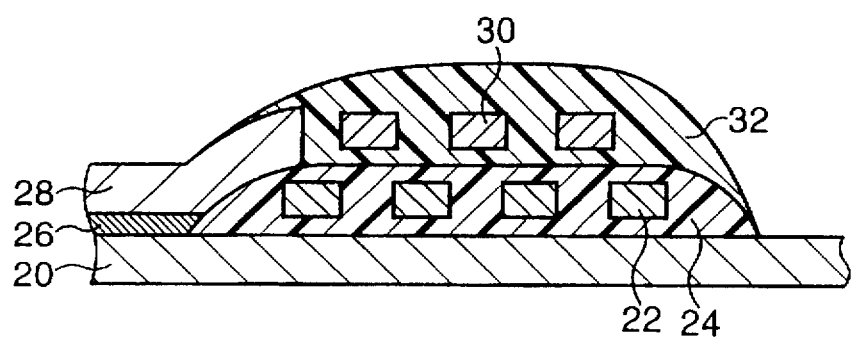
Figure 5D:
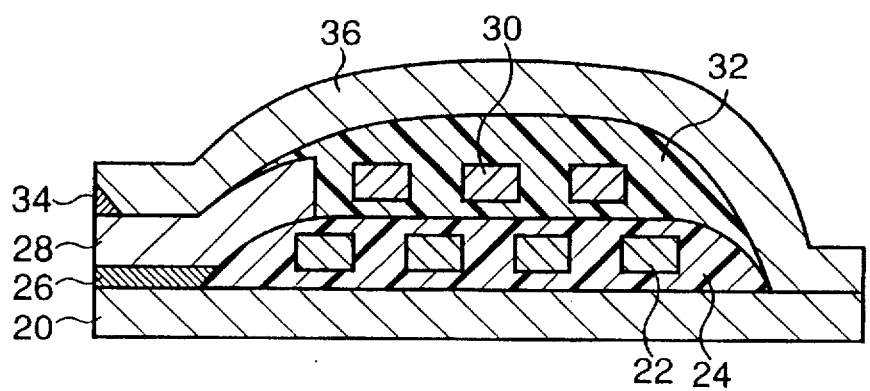

A first magnetic pole layer 20 of nickel-iron alloy is formed on a non-magnetic substrate (not shown) by frame plating. Subsequently, a thin copper film coil 22 is formed thereabove with an insulating layer disposed therebetween, and an organic insulating film 24 is provided thereon to cover the steps formed (FIG. 5A). Thereafter, a magnetic gap layer 26 of aluminum oxide is formed and an additional magnetic pole layer 28 of nickel-iron alloy is formed on the magnetic gap layer 26 by plating (FIG. 5B). Another thin copper film coil 30 is formed thereabove with an insulating layer disposed therebetween and, again, another organic insulating layer 32 made of photoresist is formed thereon to cover the steps formed (FIG. 5C). Finally, a magnetically insulating layer 34 of aluminum oxide is formed on the additionally magnetic pole layer 28 and a second magnetic pole layer 36 of nickel-iron alloy is formed by frame plating before the resulting structure is cut to a predetermined geometry and lapped (FIG. 5D).

Only an additional magnetic pole layer 28 is formed near the second magnetic pole layer 36 in this embodiment of thin film magnetic head. One of the undershoot waveforms that appear on the lateral sides of the isolated transition of magnetization can be reduced with such an arrangement. Because all the steps of the above described method for preparing a thin film magnetic head can be incorporated into the process of manufacturing wafers, it is particularly suited for mass production.

Figure 6A:
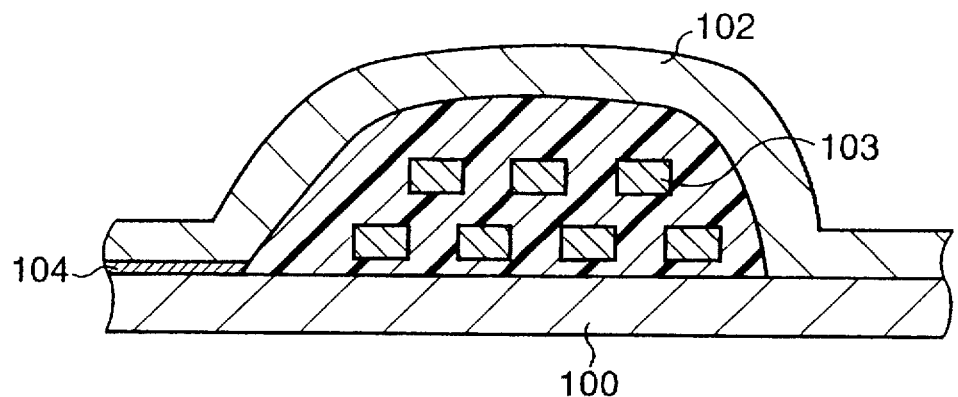
FIGS. 6A to 6C are schematic sectional views of a third embodiment of a thin film magnetic head according to the invention for use in explaining sequential steps.
Figure 6B:
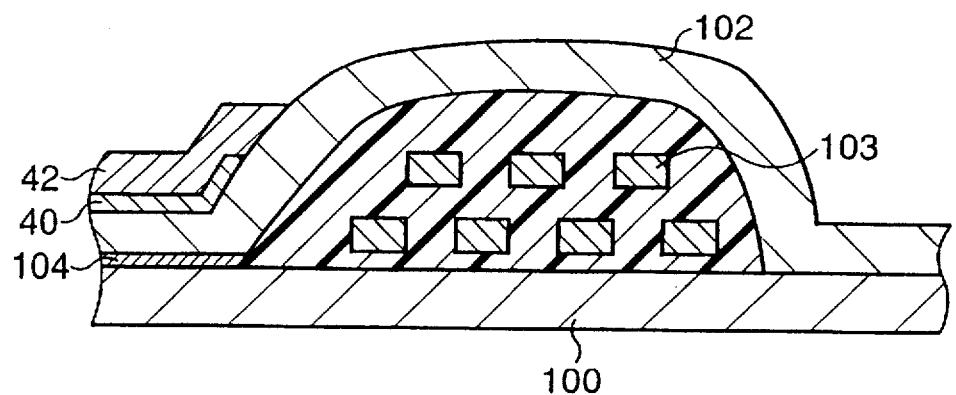
Figure 6C:
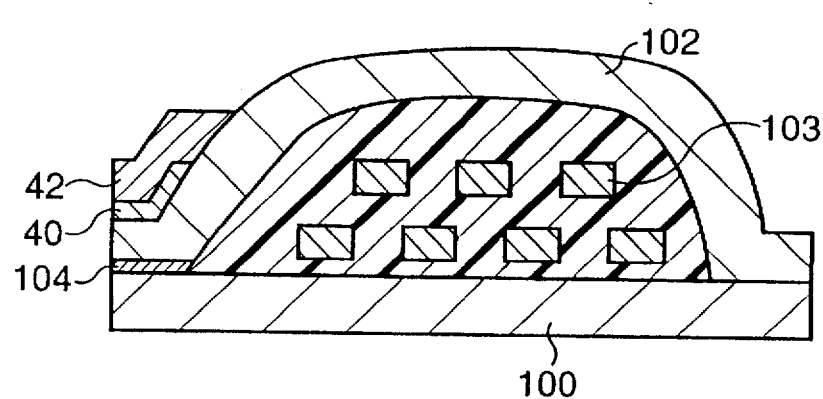

FIGS. 6A to 6C are schematic sectional views of a third embodiment of a thin film magnetic head according to the invention for use in explaining sequential steps. Here, the components of FIGS. 6A to 6C that are same or similar to their counterparts of the preceding embodiments of the thin film magnetic head are denoted respectively by the same reference symbols and will not be described here any further.

The thin film magnetic head shown in FIG. 6A is prepared by a known method. Subsequently, a magnetic insulating layer 40 of aluminum oxide is formed on the second magnetic pole layer 102 by means of an appropriate technique such as sputtering, photoresist exposure or ion milling. Thereafter, an additional magnetic pole layer 42 is formed on the magnetic insulating layer 40 of nickeliron alloy by plating (FIG. 6B). Finally, the resulting structure is cut to a predetermined geometry and lapped (FIG. 6C). This method of fabricating a thin film magnetic head is as effective as the above described method.

FIGS. 7A to 7G are schematic sectional views of a fourth embodiment of a thin film magnetic head according to the invention for use in explaining sequential steps.

Figure 7A:
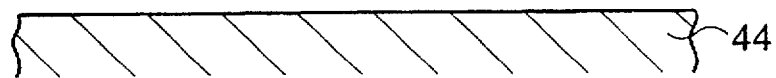
FIGS. 7A to 7G are schematic sectional views of a fourth embodiment of a thin film magnetic head according to the invention for use in explaining sequential steps.
Figure 7B:
Figure 7C:
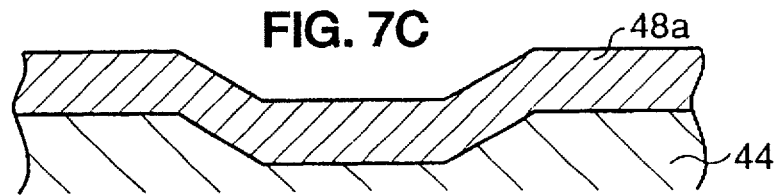
Figure 7D:
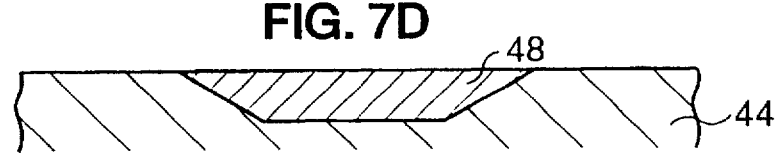
Figure 7E:
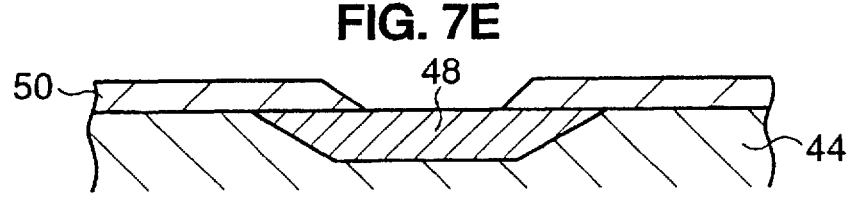
Figure 7F:
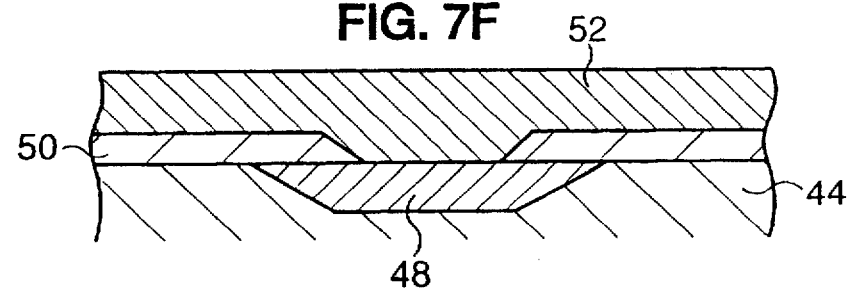
Figure 7G:
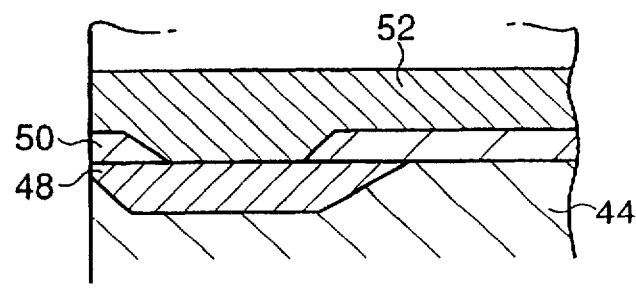

Firstly, non-magnetic substrate 44 is prepared (FIG. 7A). Subsequently, a recess of a predetermined pattern 46 is produced by means of a technique involving exposure and development of photoresist and ion milling at the position for forming an additional magnetic pole layer in the non-magnetic substrate 44 (FIG. 7B). Then, a nickel-iron alloy layer 48$a$ is formed for an additional magnetic pole layer by plating (FIG. 7C). Thereafter, unnecessary areas of the nickel-iron alloy layer 48$a$ are removed by plane lapping or etching-back to realize an additional magnetic pole layer 48 (FIG. 7D). Then, a magnetically insulating layer 50 of oxide aluminum is formed on the non-magnetic substrate 44 except part of the additional magnetic pole layer 48 (FIG. 7E). Subsequently, a first magnetic pole layer 52 is formed by means of an appropriate technique such as plating or sputtering (FIG. 7F). Then, although not shown, a thin film coil, a magnetic gap layer and a second magnetic pole layer are formed along with other necessary components as in the case of the preceding embodiments and, finally, the resulting structure is cut to a predetermined geometry and lapped (FIG. 7G). This embodiment and the method used for fabricating are as effective as their counterparts described earlier by referring to the second embodiment. In particular, this embodiment is advantageous in that, if an additional magnetic pole layer 48 is formed under the first magnetic pole layer 52 and each layer on the first magnetic pole layer 52 is made flat, the phenomena of the layers becoming thin at stepped areas can be avoided.

Figure 8:
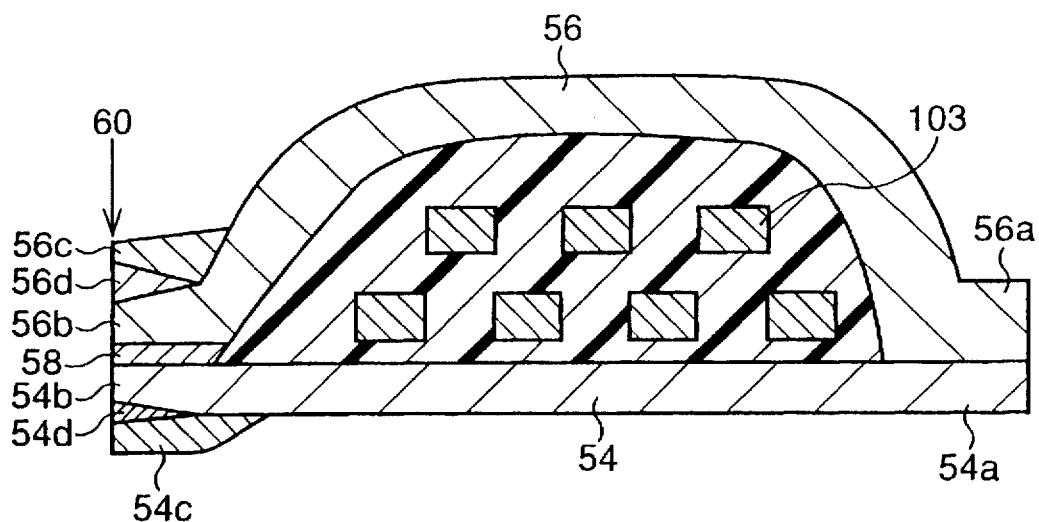
FIG. 8 is a schematic sectional view of a fifth embodiment of a thin film magnetic head according to the invention.

FIG. 8 is a schematic sectional view of a fifth embodiment of a thin film magnetic head according to the invention.

This embodiment comprises a first magnetic pole layer 54 and a second magnetic pole layer 56 that are made of an nickel-iron alloy and connected to each other at respective base sections 54$a$ and 56$a$, a thin film coil 103 wound around the second magnetic pole layer 56 and a magnetic gap layer 58 disposed between the front end sections 54$b$ and 56$b$ of the first and second magnetic pole layers 54 and 56. A first additional magnetic pole layer 54$c$ of nickel-iron alloy is provided at the front end section 54b and disposed along the plane 60 facing the recording medium, a first magnetically insulating layer 54d of aluminum oxide being disposed between the front end section 54b and the additional magnetic pole layer 54c. In the same way, a second additional magnetic pole layer 56c of nickel-iron alloy is provided at the front end section 56b and disposed along the plane 60 facing the recording medium, a second magnetically insulating layer 56d of aluminum oxide being disposed between the front end section 56b and the additional magnetic pole layer 56c.

The first additional magnetic pole layer 54c and the first magnetically insulating layer 54d are prepared by the method described above by referring to the fourth embodiment. The second additional magnetic pole layer 56c and the second magnetically insulating layer 56d are prepared by the method described above by referring to the third embodiment. Since this embodiment of the thin film magnetic head comprises a first additional magnetic pole layer 54c provided on the first magnetic pole layer 54 and a second additional magnetic pole layer 56c provided on the second magnetic pole layer 56, it is as effective as the first embodiment.

Figure 9:
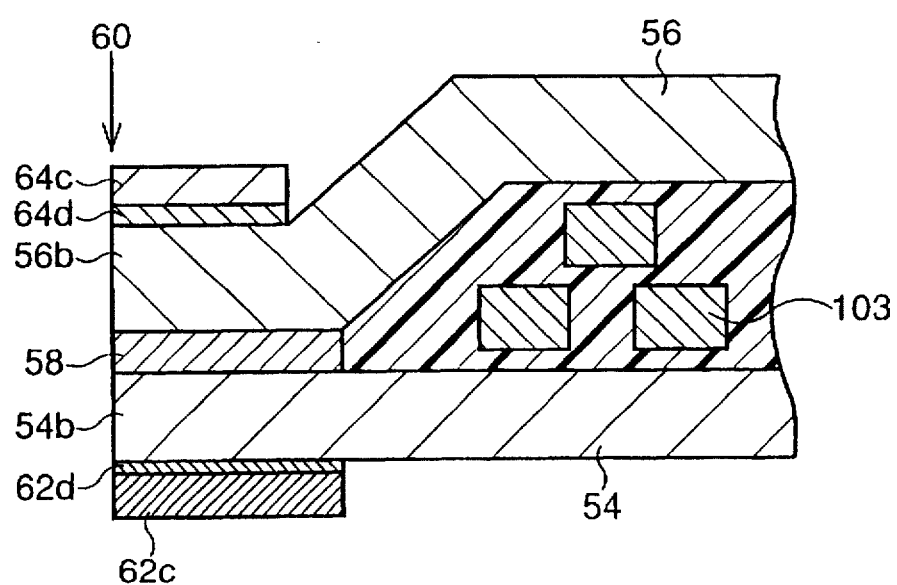
FIG. 9 is a schematic partial sectional view of a sixth embodiment of a thin film magnetic head according to the intention.

FIG. 9 is a schematic partial sectional view of a sixth embodiment of a thin film magnetic head according to the invention. Here, the components that are same or similar to their counterparts of the thin film magnetic head of FIG. 8 are denoted respectively by the same reference symbols and will not be described here any further.

In this embodiment, a first additional magnetic pole layer 62c is formed under the front end section 54b of the first magnetic pole layer 54 with a first magnetically insulating layer 62d disposed therebetween, while a second additional magnetic pole layer 64c is formed over the front end section 56b of the second magnetic pole layer 56 with a second magnetically insulating layer 64d disposed therebetween. However, the first additional magnetic pole layer 62c is not held in contact with the first magnetic pole layer 54 nor the second additional magnetic pole layer 64c is held in contact with the second magnetic pole layer 56. With such an arrangement, the undershoot waveform of a reproduced signal can be reduced.

Figure 10:
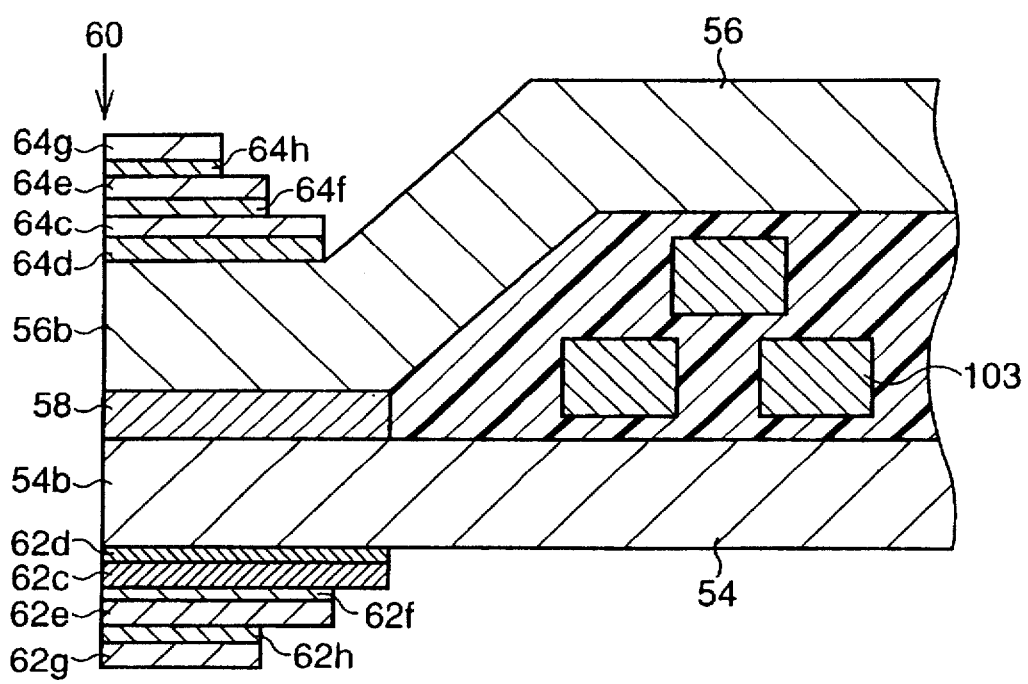
FIG. 10 is a schematic partial sectional view of a seventh embodiment of a thin film magnetic head according to the invention.

FIG. 10 is a schematic partial sectional view of a seventh embodiment of a thin film magnetic head according to the invention. Here, the components that are same or similar to their counterparts of the thin film magnetic head of FIG. 9 are denoted respectively by the same reference symbols and will not be described here any further.

In this embodiment of thin film magnetic head, a third additional magnetic pole layer 62e is formed under the first additional magnetic pole layer 62c with a third magnetically insulating layer 62f disposed therebetween and a fourth additional magnetic pole layer 62g is formed under the third additional magnetic pole layer 62e with a fourth magnetically insulating layer 62h disposed therebetween, while a fifth additional magnetic pole layer 64e is formed over the second additional magnetic pole layer 64c with a fifth magnetically insulating layer 64f disposed therebetween and a sixth additional magnetic pole layer 64g is formed over the fifth additional magnetic pole layer 64e with a sixth magnetically insulating layer 64h disposed therebetween. With such an arrangement, the undershoot waveform of a reproduced signal can be further remarkably reduced.

With a thin film magnetic head according to the invention, the undershoot outputs of the waveform of a signal reproduced by the magnetic head that are attributable to the isolated transition of magnetization can be spread over a prolonged period of time to consequently reduce the amplitude of the undershoots since there an increased number of front end sections are provided for the magnetic pole layers. Additionally, since the front end sections of the magnetic pole layers do not have to be made particularly thin, the generation of a magnetically saturated state in the magnetic pole layers can be effectively avoided. Still additionally since the terminals of the front end section of the magnetic pole layers are made flat by providing magnetically insulating layers, dust and other contaminants effectively prevented from adhering thereto to improve the reliability of the magnetic head.

With a method of fabricating a thin film magnetic head according to the invention, the magnetically insulating layers and the additional magnetic pole layers can be prepared in the process of manufacturing wafers, it can be effectively used for mass production.

While the invention has been described in its preferred embodiments, it is to be understood that the words which have been used are words of description rather than limitation and that changes within the purview of the appended claims mar be made without departing from the true scope of the invention as defined by the claims.

What is claimed is:

1. A thin film magnetic head comprising:

first and second magnetic pole layers each made of a thin film of a soft magnetic material and connected to each other at respective base sections thereof;

a thin film coil wound around at least one of said first magnetic pole layer and said second magnetic pole layer;

a magnetic gap layer disposed between a front end section of said first magnetic pole layer and a front end section of said second magnetic pole layer; and at least one magnetically insulating layer having a thickness equal to or thicker than that of said magnetic gap layer, disposed along a plane facing a recording medium, said magnetically insulating layer partitioning at least one of said front end section of said first magnetic pole layer and said front end section of said second magnetic pole layer, and said magnetically insulating layer.

2. A thin film magnetic head according to claim 1, in which said at least one magnetically insulating layer divides at least one of said front end section of said first magnetic pole layer and said frond end section of said second magnetic pole layer into a plurality of sub-sections.

3. A thin film magnetic head according to claim 1, which further comprises an additional magnetic pole layer made of a thin film soft magnetic material disposed along said plane facing said recording medium, said additional magnetic pole layer being provided over at least one of said front end section of said first magnetic pole layer and said front end section of said second magnetic pole layer with said magnetically insulating layer being interposed therebetween.

4. A thin film magnetic head according to claim 3, in which a plurality of said additional magnetic pole layers and a plurality of said magnetically insulating layers are alternately provided to form a multilayer structure.

* * * * *

UNITED STATES PATENT AND TRADEMARK OFFICE
CERTIFICATE OF CORRECTION

PATENT NO. : 5,761,014
DATED : June 2, 1998
INVENTOR(S) : Haruo Urai and Sinsaku Saitho It is certified that error appears in the above-identified patent and that said Letters Patent is hereby corrected as shown below:

Claim 2, Col. 8, line 51, "frond" should be --front--.

Signed and Sealed this

Eighteenth Day of August, 1998

Attest:

BRUCE LEHMAN

Attesting Officer    Commissioner of Patents and Trademarks